Nov. 6, 1928. 1,690,580
F. HEDLEY ET AL
MEANS FOR PROTECTING ELECTRICAL LINE CONDUCTORS
Filed July 3, 1924 2 Sheets-Sheet 1

INVENTOR
Frank Hedley &
James S. Doyle
BY
Darby & Darby
ATTORNEYS

Nov. 6, 1928.
F. HEDLEY ET AL
1,690,580
MEANS FOR PROTECTING ELECTRICAL LINE CONDUCTORS
Filed July 3, 1924 2 Sheets-Sheet 2
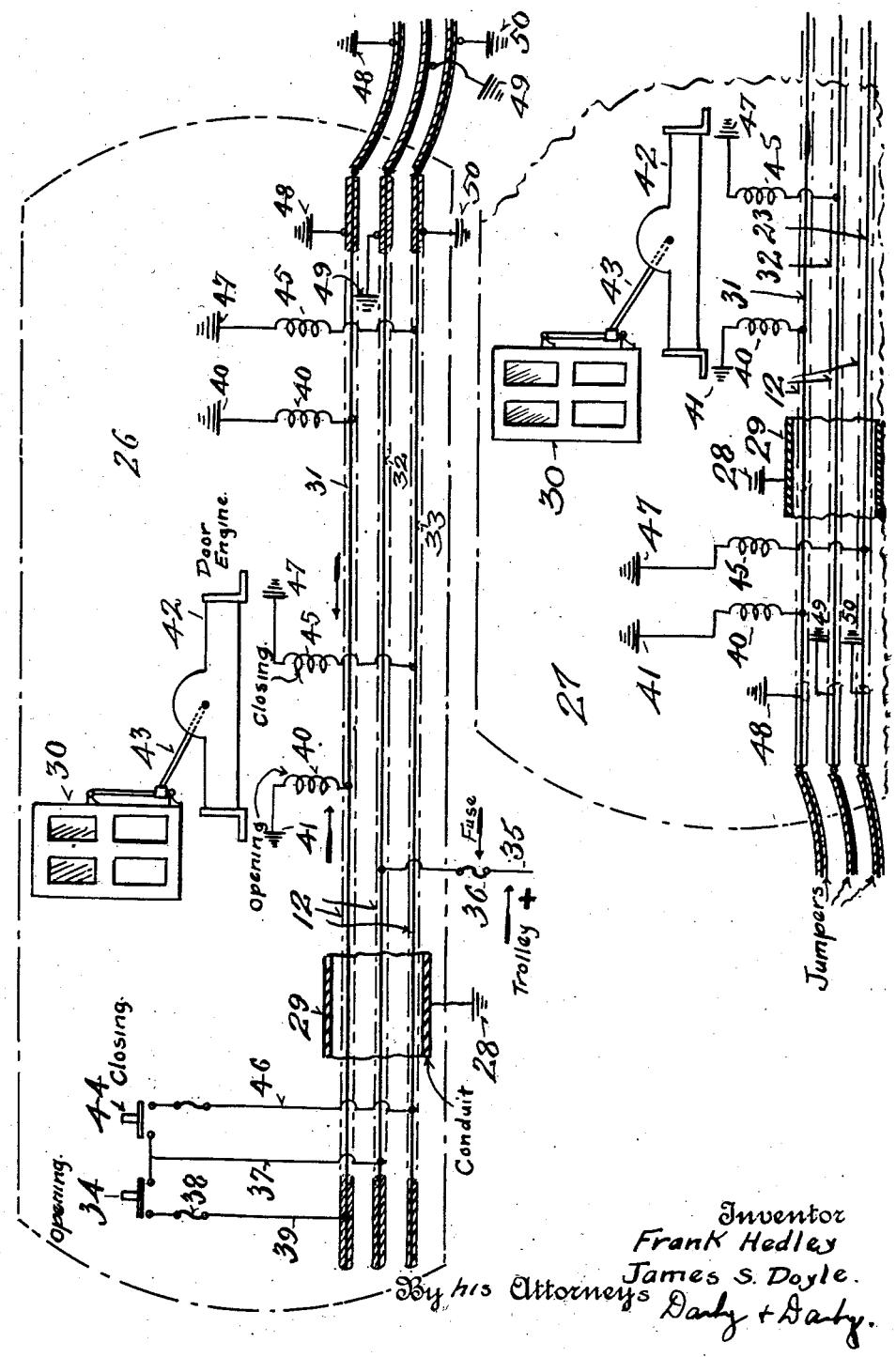
Inventor
Frank Hedley
James S. Doyle.
By his Attorneys
Darby + Darby.

Patented Nov. 6, 1928.

1,690,580

UNITED STATES PATENT OFFICE.

FRANK HEDLEY, OF YONKERS, AND JAMES S. DOYLE, OF MOUNT VERNON, NEW YORK.

MEANS FOR PROTECTING ELECTRICAL LINE CONDUCTORS.

Application filed July 3, 1924. Serial No. 723,962.

This invention relates to means for and a method of protecting electrical conductor lines and associated translation devices, and has for its object the provision of a construction for rendering electrical translating devices and conductors proof against accidental or unauthorized operation of the translating devices by untimely energization of the conductors.

Another object includes the provision of electrical conductors having a plurality of insulation layers with a conducting medium between the insulation layers, and means for permanently grounding said conducting medium.

A further object embraces the production of a protected flexible conductor core which is provided with an insulation and a flexible protective conductor, the latter being normally separated from the core by said insulation, and grounding means for the flexible conductor.

A still further object includes the provision of conductor sleeves for exposed portions of insulated conductor cores, and means for grounding said sleeves.

A further object embraces the mode of arranging and utilizing said safety conductors or cables in electrically operated systems.

Other objects will appear hereinafter, and we attain these objects by the construction as defined in the attached claims and as illustrated in the accompanying drawings, in which:—

Fig. 5 is a view showing a specific instance wherein our safety conductors are advantageously employed in the operation of doors and associated control devices on the cars of an electric train.

Similar numerals represent like parts throughout the several views.

In the use of wiring circuits in buildings, on cars, along railway tracks and, in fact, wherever electric current is supplied through line conductors for operating lights, signals, motors of various kinds, air compressors, circuit breakers, and other forms of translating devices, it is a commonly experienced danger that through accident or other cause the line conductor becomes grounded thereby causing damage or injury to the wiring system, the building or to the translating device included in circuit therewith, or an untimely operation of such translating device. This danger is vastly increased where the wiring system includes a plurality of separate flexible conductors spaced in closely assembled relation with respect to each other, and which are concerned in the operation or control of different kinds of translating devices, motors, signals or the like, and where, by accident or otherwise, such conductors become grounded or short-circuited upon each other. It is among the special purposes of our present invention to provide a method of and means for protecting the conductors of line control and wiring systems generally, and especially where a plurality of flexible line conductors are grouped together, and wherein the translating devices in the circuits of such conductors, such as motors, air compressors, signal devices, lamps and the like, of all kinds and characters, as well as the woodwork of buildings, insulation and the like, are protected against injury or damage or untimely operation, resulting from accidental grounding or short-circuiting of such conductors, whether in the case of individual line conductors or a plurality of such conductors grouped together and for whatever purpose such conductors are used, or whatever the character of the translating devices employed in connection therewith, and whatever the character of current supplied through such conductors.

While we have shown and will describe various constructions and modes of arrangement as working embodiments of our invention, and as applied to special purposes and uses, it is to be understood that our invention in its broadest scope is not to be limited or restricted with respect to any particular use, special or otherwise, to which the same is applicable.

Figure 1:
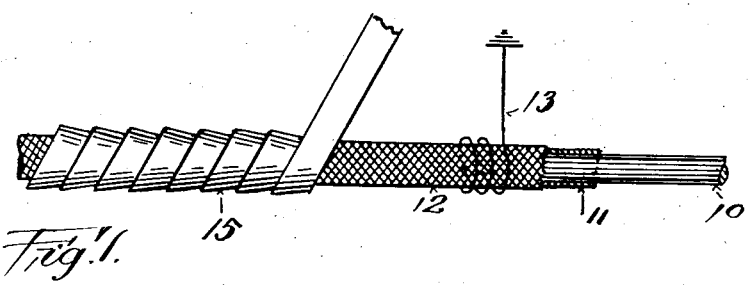
Fig. 1 is a view of one of our safety cables or conductors showing the conductor core covered with double layers of insulation, with a grounded conducting medium therebetween.
Figure 2:
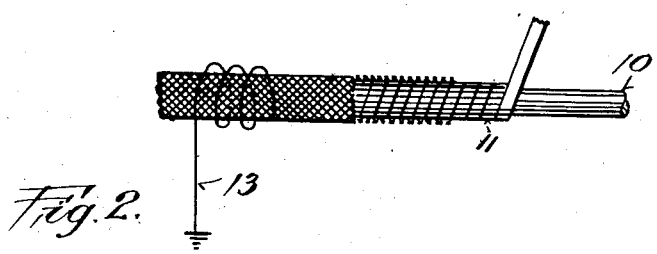
Fig. 2 is a view of another type of safety cable or protected conductor, having the grounded conducting medium normally separated from the conductor core by insulation material.
Figure 3:
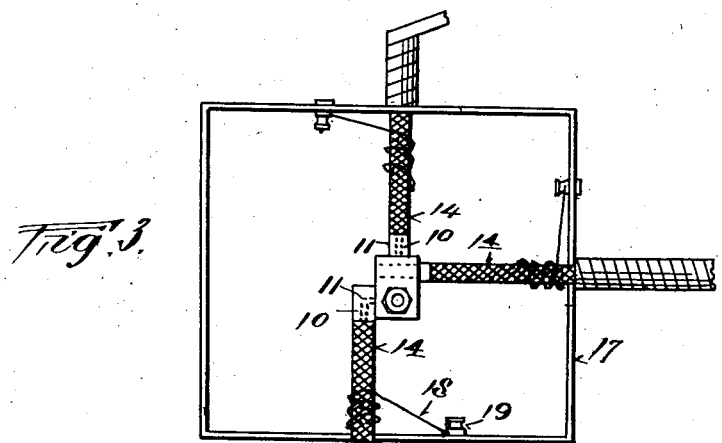
Fig. 3 is a plan view of a junction box showing the application of conductor sleeves and a mode of grounding said sleeves.
Figure 4:
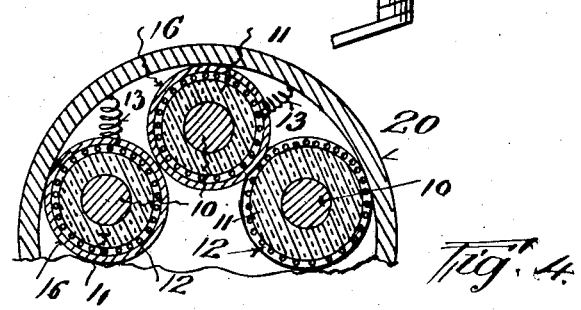
Fig. 4 is a cross-sectional view of a conduit showing the arrangement and mode of grounding a plurality of flexible safety conductors.

In one arrangement, as shown, we provide each conducting core or line conductor 10, whether used singly or in a group of a plurality of the same with an insulation 11, of any suitable thickness, and over this insulation we provide a conducting medium 12 which is provided with grounding means 13, suitably placed. This conducting medium may assume any form, as a reticulated or flexible layer shown in Figs. 1 and 2, for example, or it may assume the form of a flexible copper sleeve 14, shown in Fig. 3. The conducting medium may be further covered by insulation material in the form of a tape winding 15 or as a layer 16. Where only a portion of the conductor is exposed to wear and use, as in Fig. 3 for example, the copper sleeve type 14 may be advantageously used. In this form one of the several insulation layers may be replaced by the copper or other sleeve. This assembly is then inserted through the walls of a junction box 17, for example, with the copper sleeve 14 grounded by direct contact, as shown, or by the usual grounding wires 18 and binding posts 19. Where the simple forms of safety conductors, of Figs. 1 or 2, for example, are to be employed, as in the operation of electrically controlled trains, signal systems and the like, the safety conductors may be carried in iron pipes or conduits 20, and the reticulated or outer conducting medium is then grounded on the pipe or conduit by direct contact. The several wires required for operating the translation devices are under such conditions run through the conduit and each wire may be covered with a conducting medium for the entire length and grounded. Thus if the insulation on the wires become worn through, instead of short circuiting and causing the untimely operation of the devices connected to the wires, the current will pass through the conducting medium surrounding the wires to ground.

As an illustration of a specific application of our invention, we have shown in Fig. 5 a more or less diagrammatic representation, showing its utility in safeguarding the electrically operated translating devices used, for example, in opening and closing the doors 30 on a car in an electric train and in the operation of the train. Here we have a conduit 29, grounded as conduits are usually grounded at 28, running through two cars 26 and 27 of our train. Within this conduit are shown three individual safety cables of our door operating system 31, 32, 33. These cables are covered with the usual insulation 11 and with the grounded electrical conductor medium 12, which, as stated above, may be in the form of a conducting sleeve, reticulated covering or other suitable conductor of electricity. In some instances the pipe or conduit itself, 29, may serve this purpose. We will now briefly describe the mechanism for door operation and show how the operating devices are guarded against accidental or untimely operation. The closing of the door opening switch 34 operates to allow current to flow through the trolley, past the fuse 36, up to the conductor 32, along the conductor 32 to the wire 37, up 37, through the closed switch 34, past the fuse 38, down the wire 39 to the conductor 31, along 31 to the door opening magnet valve 40, through the windings of said magnet 40 to ground 41, and then back to the generator whose negative side is grounded. This flow of current through the magnet 40 operates a valve admitting fluid pressure to the opening side of the door operating engine and the piston being forced over by the incoming fluid pressure, exhausts the door closing side of the cylinder, the valve of which is open for such exhaust, and opens the door 30, which is as shown in a closed condition, through an arm or set of arms 43. Opening the switch 34, de-energizes 40, fluid pressure ceases to be admitted to the engine 42 and the valve is arranged so that movement by the piston in the opposite direction will exhaust the door opening side of the engine. The closing of switch 44 will have a similar effect on the door closing magnet valve 45 via the path 35 to 36 to 32 to 37 to 44 to 46 to 33 to 45 to 47, to generator. 45 is the door closing magnet valve, the energizing of which allows fluid pressure to be admitted to the door closing side of the engine 42 and the door opening side to be exhausted. Opening the switch 44, de-energizes 45, fluid pressure ceases to be admitted to the door closing side of the engine 42 and the valve is arranged so that the side will be exhausted on the door opening stroke. The construction of the door, the fluid pressure engine, the connections therebetween and the construction of the magnet valves and their connection to the engine are all old features all of which are very well known in the art and constitute alone no part of this invention. Now, assuming a short-circuit takes place between 32 and either 31 or 33; it is apparent that the effect would be the same as if switch 34 or 44 had been operated and untimely operation of the door would take place. This I prevent by grounding the reticulated elements of 31, 32 and 33 at 48, 49 and 50, whereby a current flowing between 32 and 31 or 33 when either a dead short-circuit is between them, or the insulation between the conductor and the reticulated element has worn away and switch 34 or 44 is closed, passes directly back to ground and generator and operates to "blow" the fuse 36 rather than permitting the current to flow through windings 40 or 45 to cause untimely or unstable operation of the door engine, as would occur if unprotected cables were employed. Of course if the insulation between the reticulated element and conductor in cable 32 wears away, neither 34 nor 44 has to be operated to blow the fuse 36. In the event of a short circuit between 31 and 33 the closing of either 34 or 44 will blow the fuse thereby preventing 40 and 45 being simultaneously energized. In no event, once a short-circuit has taken place, will untimely operation result.

What we claim, therefore, as new and useful, or our own invention, and desire to secure by Letters Patent, is:—

1. In a system of the type described, the combination of electrically operated power devices, a plurality of insulated conductor cores within a conduit, one of said cores being normally energized from one side of a power source the other side of which is grounded, the others of said cores being connected to said electrically operated power devices, and a conducting grounded covering encasing each of said insulated conductor cores to prevent untimely operation of said power devices by reason of the occurrence of a short circuit between said cores one on the other by shunting any short circuit currents caused thereby through said grounded coverings back to the power source, and means connected to said normally energized core for permanently opening the circuit when said short circuit occurs.

2. In a system of the type described, a plurality of insulated conductor cores normally separated, electrical translational devices connected to said conductor cores, each of said insulated conductor cores being encased in a conducting sleeve, one of said conductor cores being normally energized from one side of a power source the other side of which is grounded, means for grounding said conducting sleeves to prevent a short circuit between said conductor cores from allowing a current to flow which would result in untimely operation of said electrical translational devices, by shunting such short circuit currents through the grounded sleeves back to the power source.

In testimony whereof we have hereunto set our hands on this 24th day of June A. D., 1924.

FRANK HEDLEY.
JAMES S. DOYLE.